US011927777B2

(12) United States Patent
Jain et al.

(10) Patent No.: US 11,927,777 B2
(45) Date of Patent: Mar. 12, 2024

(54) PLASMA DISPERSION EFFECT FOR METASURFACE TUNING

(71) Applicant: Luminar Technologies, Inc., Orlando, FL (US)

(72) Inventors: Aditya Jain, Minneapolis, MN (US); Zoran Jandric, Minneapolis, MN (US); Dan Mohr, St. Paul, MN (US); Kevin A. Gomez, Eden Prairie, MN (US); Krishnan Subramanian, Shakopee, MN (US)

(73) Assignee: LUMINAR TECHNOLOGIES, INC., Orlando, FL (US)

( * ) Notice: Subject to any disclaimer, the term of this patent is extended or adjusted under 35 U.S.C. 154(b) by 741 days.

(21) Appl. No.: 16/943,927

(22) Filed: Jul. 30, 2020

(65) Prior Publication Data
US 2021/0181378 A1  Jun. 17, 2021

Related U.S. Application Data

(60) Provisional application No. 62/948,234, filed on Dec. 14, 2019.

(51) Int. Cl.
*G02B 5/00* (2006.01)
*G01S 7/481* (2006.01)
(Continued)

(52) U.S. Cl.
CPC .............. *G02B 5/008* (2013.01); *G01S 7/481* (2013.01); *G01S 7/4814* (2013.01);
(Continued)

(58) Field of Classification Search
CPC ........ G02B 5/008; G02B 1/002; G02B 1/007; G02B 26/06; G02B 1/005; G02B 6/1226; G02B 6/29335; G02B 6/42; G02F 1/292; G02F 2202/30; H01Q 15/14; H01Q 3/2676
See application file for complete search history.

(56) References Cited

U.S. PATENT DOCUMENTS

| 5,451,980 A | 9/1995 | Simon et al. |
| 2004/0150873 A1 | 8/2004 | Pearsall |

(Continued)

FOREIGN PATENT DOCUMENTS

| CN | 108072985 A | 5/2018 |
| KR | 20180082305 A | 7/2018 |

OTHER PUBLICATIONS

Chang et al., "High-Temperature Refractory Metasurfaces for Solar Thermophotovoltaic Energy Harvesting," Nano Letters, vol. 18, issue 12 (Nov. 2019).
(Continued)

*Primary Examiner* — Jonathan Y Jung
(74) *Attorney, Agent, or Firm* — HOLZER PATEL DRENNAN

(57) ABSTRACT

An active metasurface that provides low-loss and high-bandwidth modulation control of light includes a number of cells arranged on a substrate. A controller dynamically alters a voltage differential supplied to the electrodes of each of the cells is adapted to alter refractive index of each of the high-index dielectric blocks in order to controllably steer light exiting the cell.

12 Claims, 6 Drawing Sheets

(51) Int. Cl.
*G02B 1/00* (2006.01)
*G02B 6/122* (2006.01)
*G02B 27/00* (2006.01)
*G02F 1/29* (2006.01)
*G02F 1/313* (2006.01)

(52) U.S. Cl.
CPC ............ *G01S 7/4817* (2013.01); *G02B 1/002* (2013.01); *G02B 1/007* (2013.01); *G02B 6/1226* (2013.01); *G02B 27/0087* (2013.01); *G02F 1/292* (2013.01); *G02F 1/3133* (2013.01); *G02F 2202/30* (2013.01)

(56) References Cited

U.S. PATENT DOCUMENTS

| | | |
|---|---|---|
| 2010/0247022 A1 | 9/2010 | Li et al. |
| 2011/0175672 A1 | 7/2011 | Nguyen et al. |
| 2014/0224989 A1 | 8/2014 | Long et al. |
| 2016/0265749 A1 | 9/2016 | Inada |
| 2017/0131460 A1 | 5/2017 | Lin et al. |
| 2017/0176651 A1 | 6/2017 | Lee et al. |
| 2018/0059505 A1* | 3/2018 | Kyoung .................. G02F 1/292 |
| 2018/0202928 A1 | 7/2018 | Abdulhalim |
| 2018/0241131 A1* | 8/2018 | Akselrod .............. G02F 1/1339 |
| 2019/0033682 A1 | 1/2019 | Kafaie Shirmanesh et al. |
| 2019/0212586 A1* | 7/2019 | Wang ...................... G02F 1/025 |
| 2019/0285798 A1 | 9/2019 | Akselrod et al. |
| 2020/0025975 A1 | 1/2020 | Kamali et al. |
| 2020/0041825 A1* | 2/2020 | Han ...................... G02F 1/0508 |
| 2020/0227632 A1 | 7/2020 | Kim et al. |
| 2020/0387046 A1 | 12/2020 | Kim et al. |
| 2022/0197107 A1 | 6/2022 | Ogawa et al. |

OTHER PUBLICATIONS

Lee et al., "Electrically tunable multifunctional metasurface for integrating phase and amplitude modulation based on hyperbolic metamaterial substrate," Optics Express, vol. 26, issue 24 (Nov. 2018).

Ogawa et al., "Silicon-based phase shifters for high figure of merit in optical modulation," SPIE Proceedings vol. 9752, Silicon Photonics XI (Mar. 14, 2016).

Wu et al., "Dynamic Beam Steering with All-Dielectric Electro-Optic III-V multiple-Quantum-Well-Metasurfaces", Nature Communications (Aug. 2019).

Li, Erwen, et al., "One-volt silicon photonics crystal nano cavity modulator with indium oxide gate", Optics Letters, Sep. 15, 2018, 4429-4432.

* cited by examiner

PLASMA DISPERSION EFFECT FOR METASURFACE TUNING

CROSS-REFERENCE TO RELATED APPLICATIONS

The present application claims priority to U.S. Provisional Patent Application with Ser. No. 62/948,234 entitled "Tunable Metasurfaces for Beam Steering," and filed on Dec. 14, 2019, which is specifically incorporated by reference for all that it discloses or teaches.

BACKGROUND

Optical metasurfaces can locally impart changes to the amplitude, phase, and polarization of propagating electromagnetic (EM) waves. These surfaces can be designed to work in a transmission or reflection mode to perform functionality such as beam focusing, steering, and other kinds of wavefront manipulation. It is currently believed that high-performing dynamic metasurfaces could have applications in industries such as holography, variable-focus flat lenses, and beam steering for lidar.

The performance capability of a dynamic metasurface is typically described in terms of field-of-view (e.g., potential beam-steering angular range) and speed (e.g., time to manipulate EM waves in a desired way). Field-of-view depends on both the size of the individual metasurface elements, sometimes referred to as 'cells' as well as the phase shift manipulation capability of each the individual metasurface elements. In general, narrower cells provide the potential to steer light steering to wider angles while the actual capability to controllably steer light to such angles depends on the quality factor and maximum phase shift provided by each individual cell of the metasurface.

To address the foregoing demand for narrow cells that also provide large phase shifts, some metasurfaces are designed to include resonant elements. When light makes multiple passes through a resonator element, the light accumulates a phase shift proportional to the quality factor of the resonator. An ideal resonator of this nature is provided by the metric $Q\Delta n \sim 1$, where Q is the quality factor of the resonator and $\Delta n$ is the refractive-index modulation provided by the resonator. There exist a number of challenges in creating a metasurface resonating element with a high quality factor that is capable of proving large $\Delta n$ at speeds fast enough to be suitable for corresponding technical applications.

BRIEF DESCRIPTIONS OF THE DRAWINGS

SUMMARY

Implementations disclosed herein provide active metasurfaces for low-loss, high-modulation bandwidth control of light. According to one implementation, a metasurface includes a number of cells formed on a substrate. Each of the cells includes a high-index dielectric block including an interface between a positively-doped material and a negatively-doped material and electrodes configured to provide a voltage differential across the high-index dielectric block to flow current along a current path that passes through the high-index dielectric block such that at least a portion of the current path is substantially parallel to a plane defined by the metasurface. The metasurface further includes a controller that dynamically alters a voltage differential supplied to the electrodes of each of the cells to alter a refractive index of each of the high-index dielectric blocks in order to controllably steer light exiting the cell.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTIONS

Implementations described and claimed herein provide various tunable metasurfaces for dynamic beam-steering.

Figure 1:
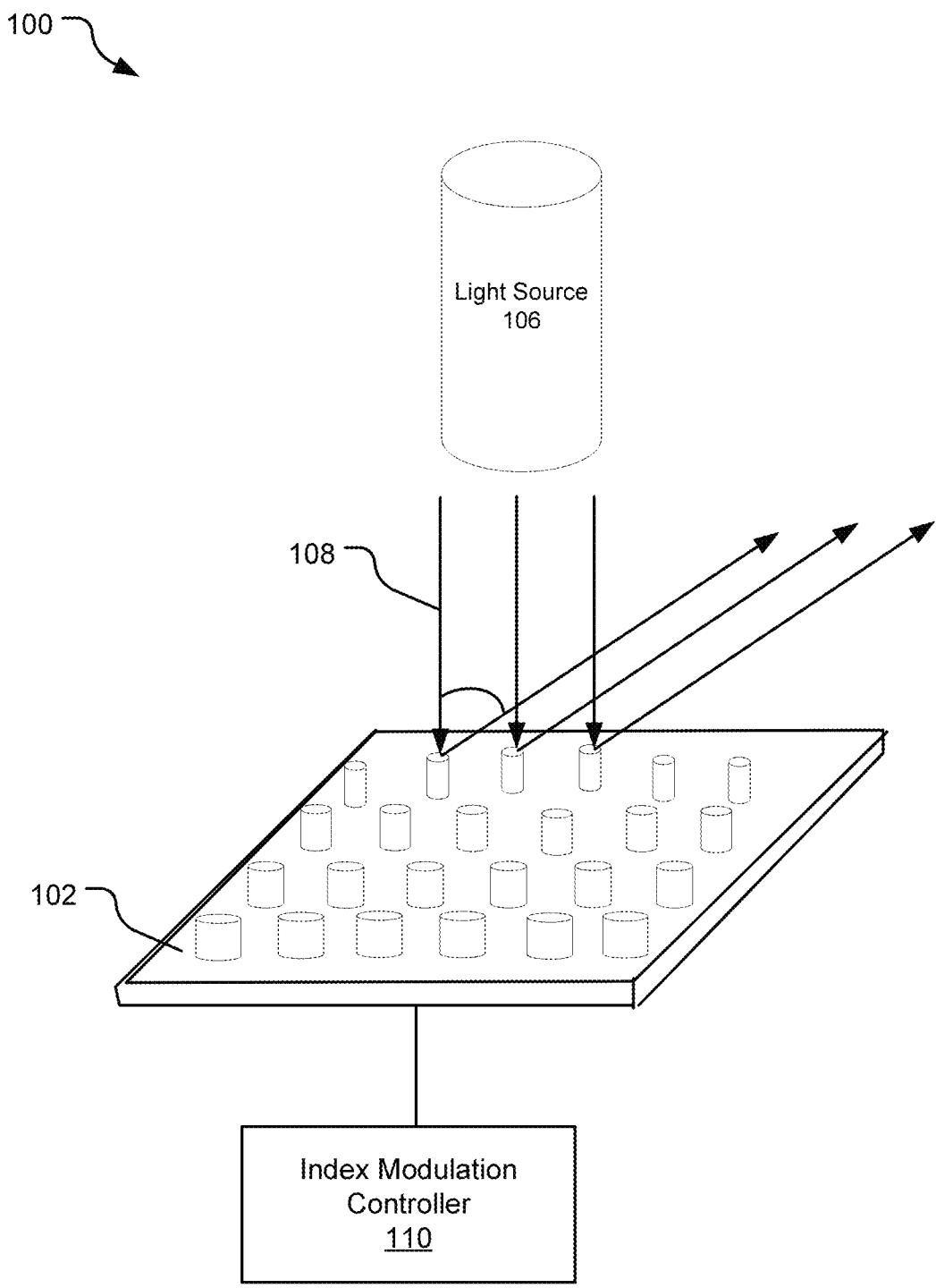
FIG. 1 illustrates an example beam-steering system that includes an active metasurface with periodically-repeated unit cells that function as resonators to trap, internally reflect, and controllably steer light.

FIG. 1 illustrates an example beam-steering system 100 that includes a metasurface 102 with periodically-repeated unit cells (e.g., a cell 104) that function as resonators to trap, internally reflect, and controllably steer light of a target wavelength. A light source 106 directs a light beam 108 toward the metasurface 102 and an index modulation controller 110 provides electrical signals to modulate the refractive index of each of the cells on the metasurface 102 to selectively steer outbound light that is received at each cell. In the illustrated implementation, the metasurface 102 is shown acting in a reflective mode in which light is reflected off of the same surface at which it is received. In some implementations, the metasurfaces disclosed herein are configurable to operate in a transmissive mode in addition to or instead of the reflective mode.

Each of the cells of the metasurface 102 includes a light phase-shifting element that provides steering across a large field-of-view using a high-dielectric index block that provide a high Q-factor and high refractive index modulation ($\Delta\eta$). In some implementations, the potential change in the refractive index $\Delta\eta$ is on the order of $10^{-3}$ or $10^{-4}$. Although the disclosed resonators may be constructed from a variety of materials, the above-referenced $\Delta\eta$ may be observed even in some of the following implementations when less expensive, common semiconductor materials are used within the resonator, such as silicon and silicon-based materials.

Notably, FIG. 2-6 are described as metasurface; yet, these images shown a small number of cells (e.g., 1-3 cells) for simplicity of illustration. It is to be understood that each of these metasurfaces may actually include hundreds or thousands of such cells. Although not specifically shown or described, is may be understood that the metasurface cells shown in FIG. 2-6 may receive signals modulated by an index modulation controller that controllably modulate an index of a material within each of the cells to steer outgoing light.

Figure 2:
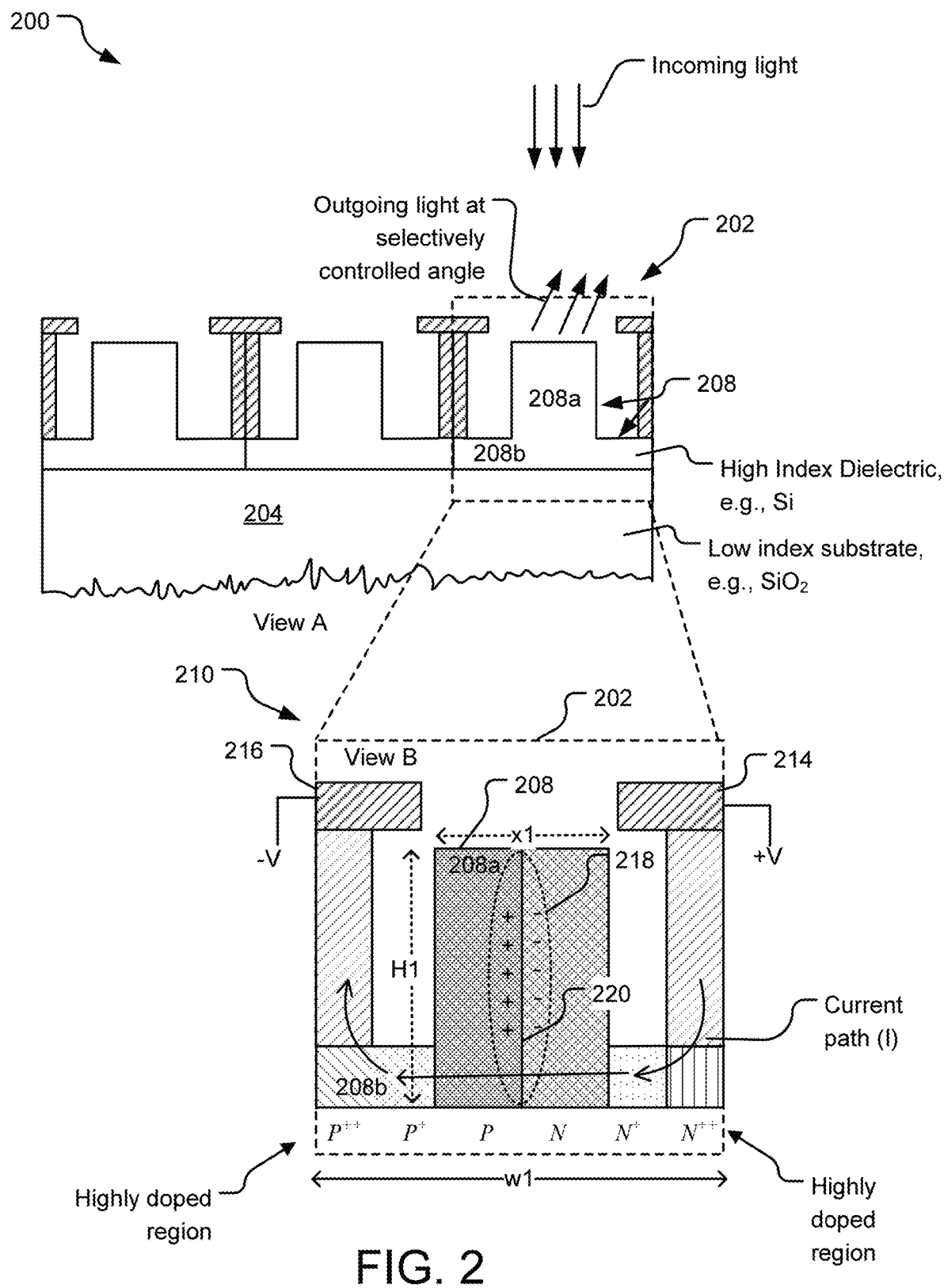
FIG. 2 illustrates an example tunable metasurface that provides low-loss and high-bandwidth modulation control of incident light of a target wavelength.

FIG. 2 illustrates an example tunable metasurface 200 that provides low-loss and high-bandwidth modulation control of incident light of a target wavelength. As shown by View B, each of the cells includes a high-index dielectric block 208 positioned between two electrodes 214, 216, all of which are formed on top of a low-index dielectric substrate 204. The high-index dielectric block 208 has a refractive index that is higher than that of the underlying low-index dielectric substrate 204. For example, the dielectric block 208 has an index larger than or equal to about 2.6-3.8 while the substrate has an index block that at or below about 1-1.5. Although a variety of semiconductor materials may be suitable, the high-index dielectric block 208 is, in one implementation, a complementary metal-oxide-semiconductor (CMOS) compatible material, meaning that the metasurface 200 can be made in a silicon foundry with the types of materials commonly used in integrated circuit (IC) chips. For example, the high-index dielectric block 208 may be a silicon block. In the same or another implementation, the low-index dielectric substrate 204 is silicon dioxide.

The high-index dielectric block 208 includes a phase-shifting portion 208a and a base portion 208b. The phase-shifting portion 208a acts as a resonator for light of a target wavelength while the base portion 224 provides a conductive current path between the electrodes 214, 216 and the phase-shifting portion 208a. This current path is, in general, parallel or substantially parallel (e.g., within +/−5% of parallel) of a plane defined by the metasurface 200. By altering a voltage differential applied to the adjacent electrodes 214, 216, a controller of the system (not shown) can leverage a phenomena known as the plasma dispersion effect to controllably shift the index of the high-index dielectric block 208. The magnitude of this shift is, in general, proportional to an intensity of current flowing through the high-index dielectric block 208. This current flow through the high-index dielectric block 208 depends on the internal electrical field that is due to the controlled voltage differential as well as the material conductivity, which is given by the doping concentration of the high-index dielectric block 208.

In FIG. 2, the semiconductor material of the cell 202 is shown to have a positive charge density that increases in a first direction (toward the left of the figure) and a negative charge density that increases in a second opposite direction (toward the right of the figure). Within the positively doped region, the doping increases from P to P++. Likewise, the doping increases from N to N++ in the negatively-doped region. In other implementations, this range of concentrations may be different (e.g., from +N to +P or from N to P). In general, high doping at the electrode contacts helps to promote stronger current flow through the cell 202; however, high doping in the middle of the cell 202 can lead to optical losses.

In the illustrated example, the cell 202 is reverse-biased and a negative voltage is applied to the positively-doped side of the cell 202 while a positive voltage is applied to the negatively-doped side of the cell 202. This configuration results in a depletion of the number of charge carriers at the p/n junction illustrated by interface 218. Although reverse biasing is not necessary to implementation, this configuration may result in lower losses of the resonator than a forward-biased configuration. For example, the index change $\Delta n$ may be on the order of $10^{-3}$ when the cell 202 is reverse-biased and driven in carrier depletion mode and on the order of $10^{-4}$ when the cell 202 is forward-biased and driven in carrier-injection mode. This $\Delta n$ corresponds (via the relation $v=c/n$, where $v$ is frequency and $c$ is the speed of light) to an attainable modulation in bandwidth which may be, for example, up to 40 GHz when the cell 202 is driven in depletion mode.

While the index change $\Delta n$ depends on the current flow through the high-index dielectric, the Q-factor of the resonator depends on the optical frequency targeted by the resonator ($v_0$), the fractional power loss (l) per round trip, the round-trip travel time ($T_{rt}$) of light through the resonator (Equation 1, below):

$$Q = v_0 T_{rt}\left(\frac{2\pi}{l}\right) \quad (1)$$

According to one implementation, the cell 202 has dimensions designed to excite Mie resonance modes in the high-index dielectric block 208 at a target wavelength, thereby enhancing an electric field component of light of a target wavelength and causing the light to bounce around more within the high-index dielectric block 208 before exiting the cell 210. This Mie mode resonance significantly reduces the fractional power loss (l), providing for a very high Q-Factor between 1000 to 10,000. Although the cell 202 may be sized to provide Mie mode resonance for a variety of different target wavelengths in different implementations, the target wavelength of the cell 202 is, in one implementation, 1500 nm (e.g., the lidar wavelength) while the cell 202 has a width W1 of approximately 1000 nm with a phase-shifting region height H1 of 400-500 nm. In one implementation, the Mie modes excited in the phase-shifting portion 208a are ~1000-10,000.

In general, the potentially available field-of-view for the cell 202 improves as the pitch of the cell (e.g., W1/H1) decreases. This is because the steering angle (θ) is governed by the relation: $\sin \theta = \lambda/(\text{inter unit cell pitch})$, where $\lambda$ is the target wavelength. At the same time, light of a target wavelength is captured when the cellular width W1 is smaller than the target wavelength ($\lambda$).

Notably, the electrodes 214, 216 are positioned relative to the cell so as to cause current to flow laterally along the plane of the metasurface 200 within the base of the cell 202 (e.g., a direction generally perpendicular to that of incident light striking from above). When transparent semiconductor materials are used for high-index dielectric block 208 and low-index dielectric substrate 204, this placement of the electrodes 214, 216 ensures that (1) there is no light loss due to electrodes blocking incident light; and (2) the metasurface 200 may be optionally driven in a transmissive mode instead of reflective mode. When the metasurface 200 operates in reflective mode (as shown), light is received on an upper surface of the metasurface 200 and reflected off of the same surface. In a transmissive mode, light may be projected up through a lower surface of the metasurface (through the low-index dielectric substrate 204) to be reemitted out of the opposite upper surface.

Figure 3:
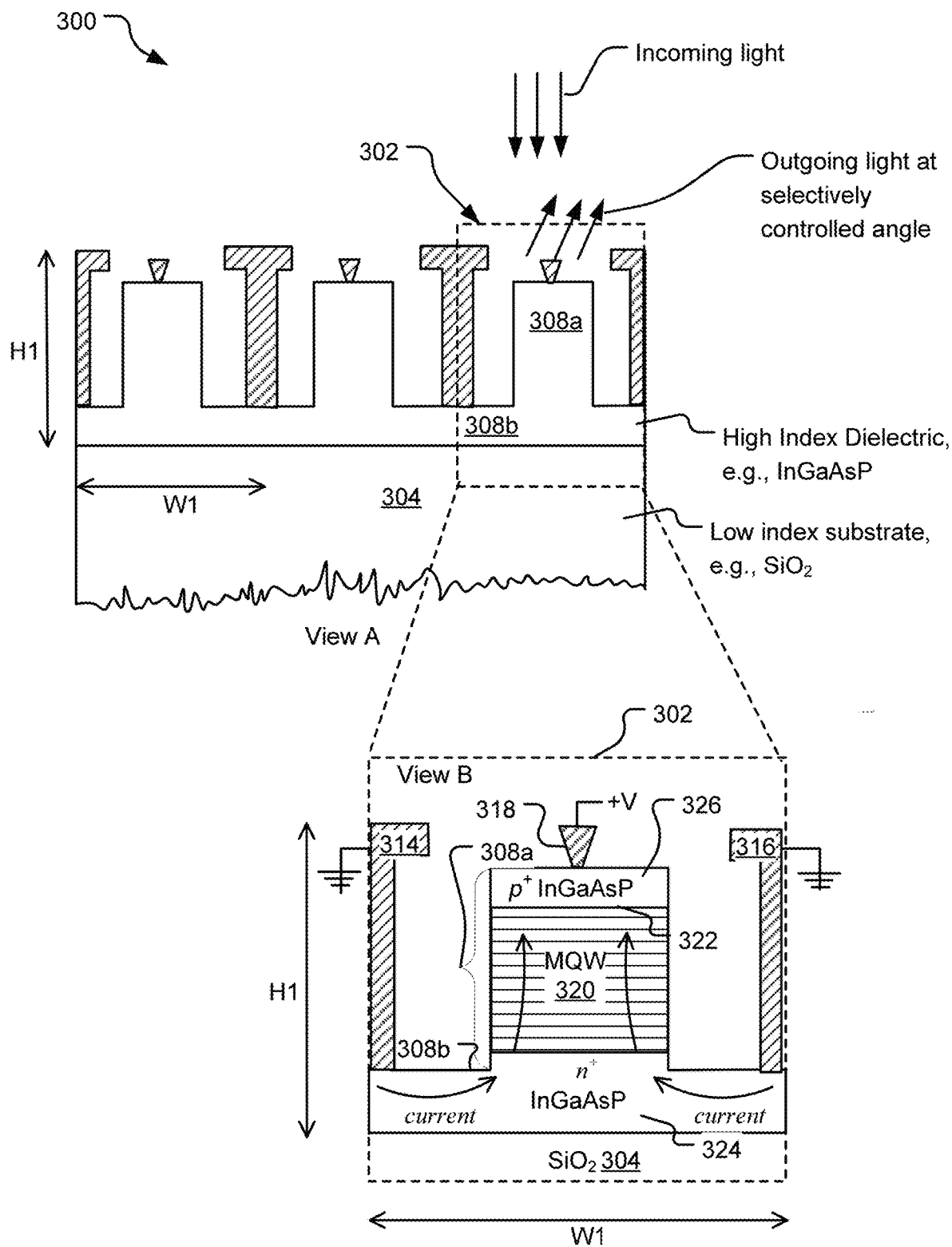
FIG. 3 illustrates another example implementation of a tunable metasurface that provides low-loss and high-bandwidth modulation control of incident light of a target wavelength.

FIG. 3 illustrates another example implementation of a tunable metasurface 300 that provides low-loss and high-bandwidth modulation control of incident light of a target wavelength. Like the tunable metasurface 200 of FIG. 2, the tunable metasurface 300 includes a number of periodically-repeated cells (e.g., a cell 302 shown in expanded view B) formed on top of a low-index substrate 304 (e.g., $SiO_2$). Each of the periodically-repeated cells includes a high-index dielectric block 308 comprising a phase-shifting portion 308a and a base portion 308b. The phase-shifting portion 308a is positioned between two electrodes 314, 316 and a third electrode 318 is formed on top of the phase-shifting portion 308a.

The phase-shifting portion 308a includes a periodic structure known as a multiple quantum well (MQW 320), which includes layers of semiconductors of significantly different band gaps such that multiple quantum wells are formed in the lower band gap layers. The individual layers of the MQW 320 are thin enough to allow carrier transport tunneling to occur. For example, these layers may be on the order of 1 μm in thickness. According to one implementation, the number of layers of the MQW 320 is sufficient to achieve a full $2\pi$ phase shift of incident light while still keeping the loss low (e.g., less than about 4-5 dB input to output). The quantum wells in the different layers of the MQW 320 are, in one implementation, asymmetrically coupled for maximum phase change.

The MQW 320 is, in one implementation, a III-V semiconductor superlattice with an index (n) that is electrically tunable via a combined effect of multiple phenomena including band filling, the quantum-confined stark effect, the Franz-Keldysh effect, and the plasma dispersion effect.

The high-index dielectric block 308 includes at least a positively-doped upper region 326 (e.g., within the phase-shifting portion 308a) and a negatively-doped lower region 324 (e.g., within the base portion 308b and, in some cases, also within a lower portion of the phase-shifting portion 308a). The MQW 320 may itself be lightly doped with, for example, "n" such that a p/n junction 322 exists within the phase-shifting portion 308a.

Although a variety of suitable III-V semiconductor materials may be utilized to form the alternating layers of the MQW 320, the layers are, in one implementation, alternating layers of $In(x)Ga(x-1)As(y)P$, where x and y assume different values depending on whether the associated layer is an even-numbered layer or an odd-numbered layer within the MQW 320. In one implementation, the even-numbered layers of the MQW 320 have a mixing ratio $In(x)Ga(x-1)As(y)P$ that results in a higher bandgap than a mixing ratio $In(x')Ga(x'-1)As(y')P$ of the odd-numbered layers.

In one implementation, the positively-doped upper region 326 and the negatively-doped lower region 324 comprise the same material (e.g., InGaAsP) as the MQW 320 with still further different mixing ratios. This variable composition ensures that the different regions of the phase-shifting portion 308a are lattice matched and thus of high crystal quality. In other implementations, the base portion 308b of the cell comprises a different base material than the MQW 320. For example, the MQW 320 may comprise InGaAsP while the base portion 308b comprises GaAs or AlGaAs.

Index modulation of each of the cells in the metasurface 300 is performed by a controller (not shown) that dynamically controls voltage supplied to one or more of the electrodes 314, 316, and 318. In FIG. 2, the electrodes 314, 316 are electrically grounded and the controller modulates a voltage setpoint that is applied to the electrode 318. This causes current to flow through the high-index dielectric block 308 in a direction that is generally up and through the high-index dielectric block 308, as indicated by arrows in FIG. 2. Notably, the positioning of the grounded electrodes 314, 316 on opposite sides of the cell 302 ensures that a portion of the current path is parallel or substantially parallel to a primary plane defined by the metasurface 300. This design feature allows the bottom of the cell 302 to remain metal-free and transparent such that the cell 302 may optionally be used in either a transmissive mode (e.g., receiving light through a first surface and re-emitting the light through a second opposite surface) or a reflective mode (e.g., receiving and re-emitting light through a same surface).

Like FIG. 1, the cell 302 may have dimensions designed to excite Mie resonance modes at a target wavelength, providing for a high Q-Factor. Although the cell 302 may be sized to provide Mie mode resonance for a variety of different target wavelengths in different implementations, the target wavelength of the cell 302 is, in one implementation, 1500 nm while the cell 302 has a width W1 of approximately 800-1000 nm and phase-shifting element height H1 of 400-500 nm.

In comparison to the design of FIG. 2, the metasurface 300 index tuning that is much larger (e.g., 2-3× larger) than the metasurface 200 due to the usage of III-V semiconductor materials in the MQW 320, which provide an index change and corresponding phase shift that is larger for a given voltage change than that attained by a same voltage change applied across the high-index dielectric block 308 in FIG. 2 (e.g., a uniform CMOS-compatible material semiconductor block).

Figure 4:
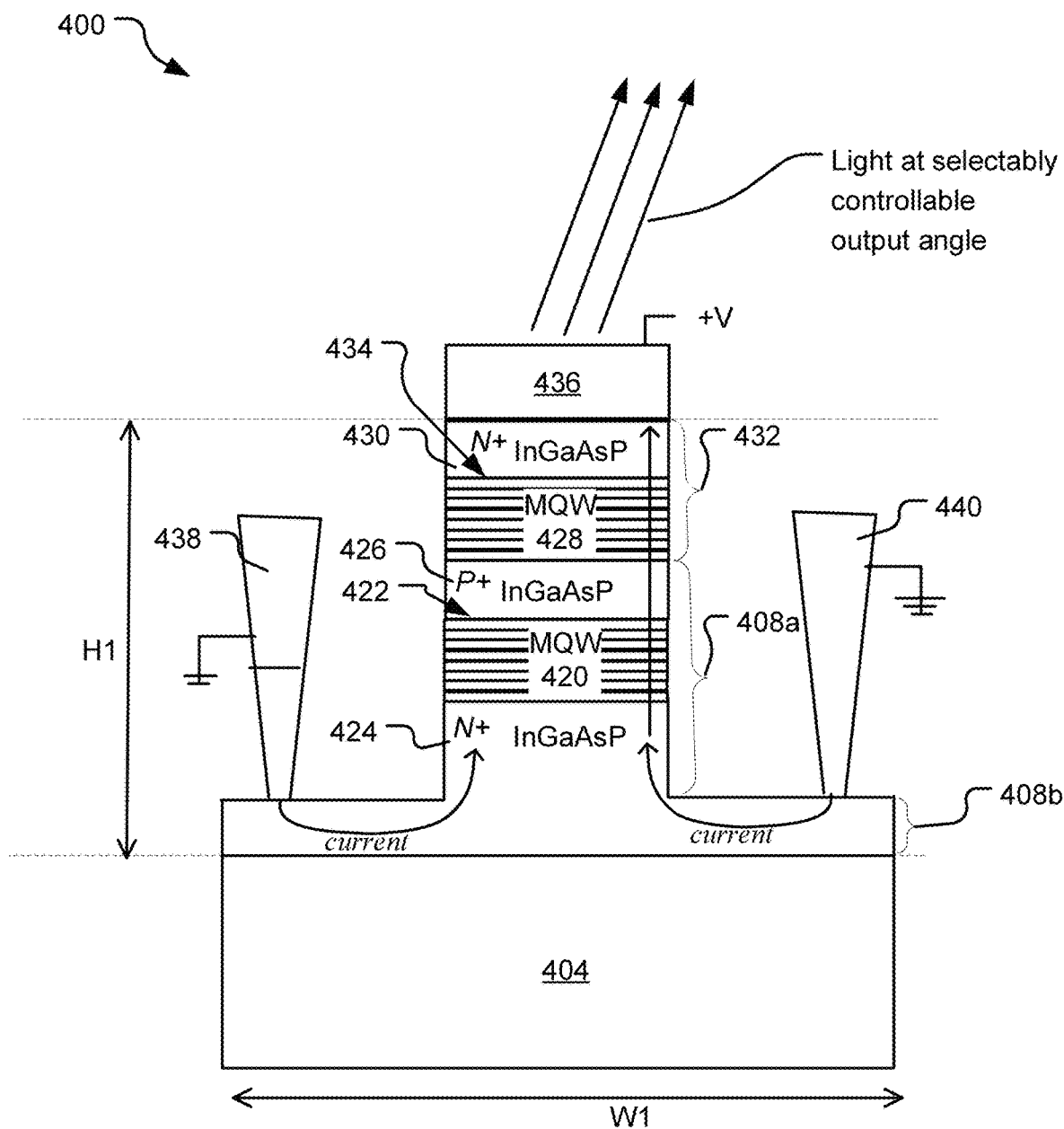
FIG. 4 illustrates an example cell of yet another tunable metasurface that provides low-loss and high-bandwidth modulation control of incident light of a target wavelength.

FIG. 4 illustrates an example cell 400 of yet another tunable metasurface that provides low-loss and high-bandwidth modulation control of incident light of a target wavelength. Like the cells of FIG. 2-3, the cell 400 includes a low-index base substrate 404 and a high-index dielectric block including a phase-shifting portion 408a and a base portion 408b. The phase-shifting portion 408a includes a first MQW 420 positioned between and in contact with a positively-doped semiconductor region 426 and a negatively-doped semiconductor region 424. The MQW 420 may itself be lightly doped with, for example, "n" such that a p/n junction 422 exists within the phase-shifting portion 408a. Similar to the MQW of FIG. 3, the MQW 420 may include a phase shift epitaxial material and serves as a phase shifting region. For example, the MQW 420 may be a III-V semiconductor superlattice with an index (n) that is electrically tunable via a combined effect of multiple phenomena including band filling, the quantum-confined stark effect, the Franz-Keldysh effect, and the plasma dispersion effect.

The cell 400 differs from the implementation of FIG. 3 primarily due to the additional inclusion of a light-emitting region 432 on top of the phase-shifting portion 408a. The light-emitting region 432 includes a MQW 428 that includes gain epitaxial material, such as a III-V semiconductor superlattice that is doped to be of an opposite polarity relative to the phase-shifting region 408a. For example, the MQW 428 may be lightly positively doped (p+), such that a p/n junction 434 exists at an upper boundary with another negatively-doped region 430.

A transparent electrode 436 is formed on top of the light-emitting region 432. For example, the transparent electrode 436 may be a layer of indium tin oxide (ITO) or other suitable material that does not significantly impede throughput of light. As described further below, the placement of the transparent electrode 436 provides interconnection for the entire cell 400 at a single voltage pumping point.

The placement of the electrodes 438, 440 on opposite sides of the cell 400, combined with use of the transparent electrode 436, beneficially allows for maximal light output from the cell 400 (e.g., due to the absence of metal in the light path that may act as a reflector and/or absorber). In some implementations, a non-transparent electrode may be used on top of the cell in place of the transparent electrode 436. In one such implementation, a non-transparent electrode is placed at the center of the cell 400 so as to minimize loss (e.g., since the field is also lowest at the center of the cell 400).

In various implementations, the MQWs 420 and 428 may be formed of various III-V semiconductor superlattice materials. By example and without limitation, the MQWs 420 and 428 are, along with semiconductor regions 424, 426, and 430, shown to include indium-gallium arsenide phosphide (InGaAsP), which may, for example, be of the form $In_xGa_{1-x}As_yP_{1-y}$. Other suitable materials may, for example, include GaAs and/or AlGaAs, depending upon the target wavelength of operation.

In one implementation, the MQW 420 and MQW 428 both include alternating layers of InGaAsP with different mixing ratios in (1) the alternating even/odd layers within each MQW as well as (2) different mixing ratios relative to one another. That is, the MQW 420 may include alternating layers of In(x)Ga(1-x)As(y)P and In(x')Ga(1-x')As(y')(P) while the MQW 428 includes alternating layers of In(x")Ga(1-x")As(y")(P) and In(x''')Ga(1-x''')As(y''')P. Within the MQW 420, the mixing ratios of x, x', y, y' are selected ensure that the MWQ provides a maximum phase shift via band filling, the quantum-confined Stark effect, the Franz-Keldysh effect, and the plasma dispersion effect, and therefore acts as a passive phase shifter. Within the MQW 428, the mixing ratios of x", x''', y", and y''' are selected to ensure that the Photoluminescence bandwidth matching a target output wavelength (e.g., 1550 nm in the case of Lidar).

During active operation of the cell 400, a metasurface controller (not shown) may controllably modulate a voltage supplied to the transparent electrode 436 while other electrodes 438, 440 couple the base portion 408b of the high index dielectric block to electrical ground. This voltage difference across the high-index dielectric block causes current to flow through the base portion 408b and up through both the phase-shifting portion 408a and the light-emitting region 432, as generally shown by the arrows in FIG. 4. This current flow causes both (1) a change in the index of refraction of the phase-shifting region 408 as well as (2) spontaneous emission of photons of predefined wavelength within the MQW 428. Light generated in the MQW 328 of the light-emitting region 432 bounces around in the phase-shifting region 408a before exiting through the transparent electrode 436 at the top surface of the cell 400.

Like the metasurface cells of FIG. 2-3, the cell 400 may be sized to provide Mie mode resonance for light generated within the light-emitting region 432 that is of predefined wavelength. In one implementation, the light-emitting region 432 generates light that is on the order of 1500 nm in wavelength while the cell 302 has a width W1 of approximately 800-1000 nm and a height H1 (e.g., phase shifting portion 408a and light-emitting region 432) of about 800-1000 nm.

The above-described characteristics may provide for an index change within the phase-shifting region 408a that is on the order of $\Delta\eta \sim 10^{-3}$ with high gain (e.g., a modal gain of or greater to about 25 cm$^{-1}$) from III-V epitaxial growth, which is sufficient to compensate for losses occurring within the cell 400.

Figure 5:
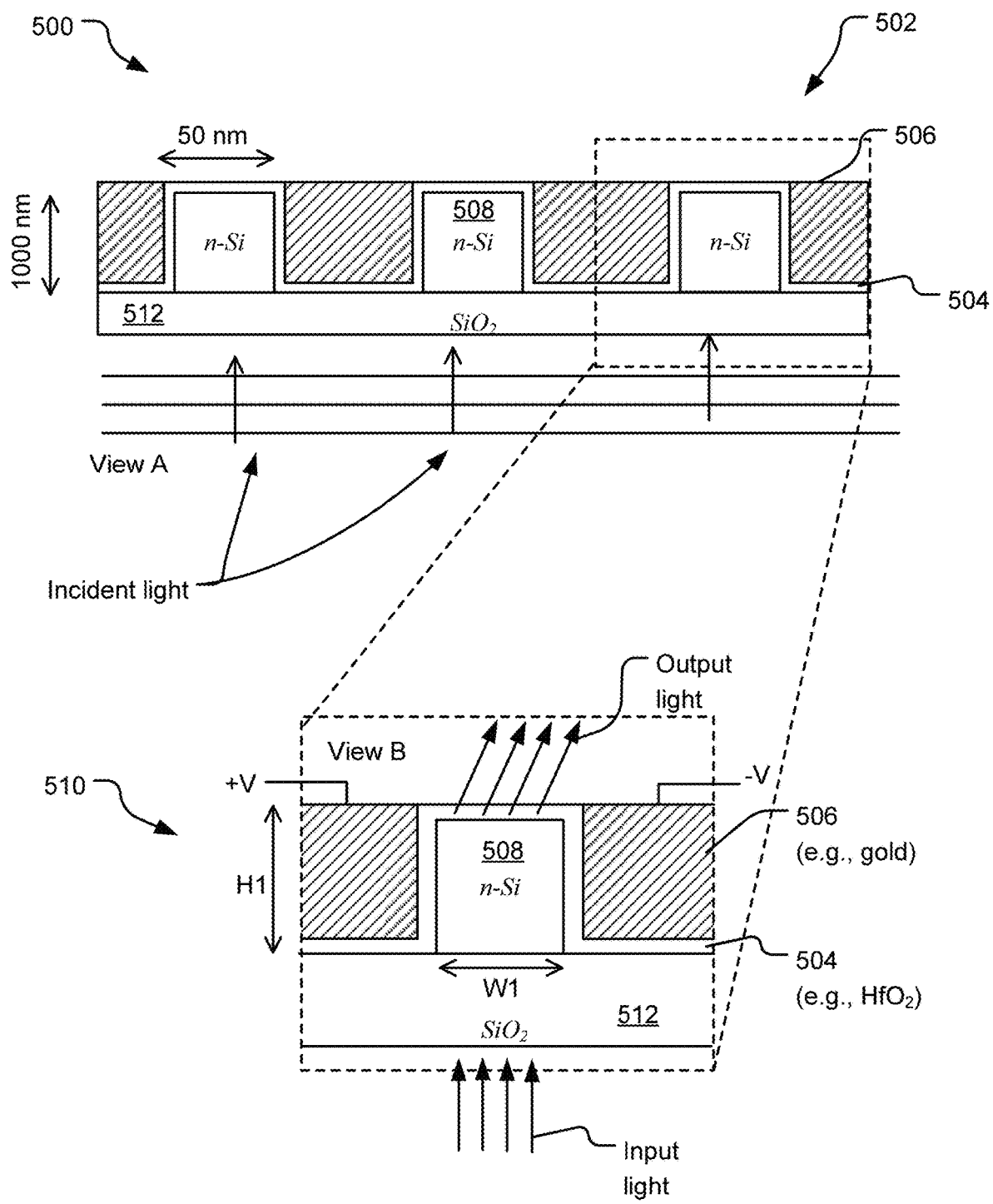
FIG. 5 illustrates yet another example metasurface that provides low-loss and high-bandwidth modulation control of incident light of a target wavelength.

FIG. 5 illustrates yet another example metasurface 500 that provides low-loss and high-bandwidth modulation control of incident light of a target wavelength. The metasurface 500 includes a number of periodically-repeated cells (e.g., a cell 510 shown in expanded view B) formed on top of a low-index substrate 512. In one implementation, the low-index substrate 512 is silicon dioxide. Each of the periodically-repeated cells includes a phase-shifting portion that is formed by a MOS-capacitor (Metal-Oxide-Semiconductor) structure. In general, a MOS-capacitor is a two terminal device that consists of a metal gate electrode (e.g., metal layer 506) a separating oxide insulator (e.g., the oxide layer 504) and a semiconducting layer (e.g., a semiconductor block 508). In MOS-capacitors, surface conductivity can be modulated by varying a voltage between the metal gate electrode and the semiconducting layer.

In the implementation of FIG. 5, the oxide layer 504 of the MOS-capacitor structure functions as a plasmonic waveguide to trap light, internally reflect the light, and to phase shift the light by a predetermined amount. The phase shift is controlled by a voltage differential applied to leads on the metal layer 506 on opposite sides of the semiconductor block 508. This voltage differential creates an electric field between the semiconductor block 508 and the oxide layer 504, which in turn causes a carrier accumulation effect that changes the free charge density by confining plasmons at the interface between the semiconductor block 508 and the oxide layer 504. Electrons accumulate at the metal-oxide interface and thereby change the refractive index inside the semiconductor block 508 near the interface. For example, the index change may extend to ~5 nm inside the semiconductor block 508.

When the MOS-capacitor structure is functioning as a plasmonic waveguide, light resonates within a region of the semiconductor block 508 near the interface with the oxide layer 504 (e.g., within a region at or less than about 5 nm from the interface with the oxide layer 504) and also resonates within the oxide layer 504 and the metal layer 506 (e.g., within a region of the metal layer 506 that is at or less than about 30 nm from the interface with the oxide layer 504). Selective variation in the index of the semiconductor block 508 increases the phase accumulation of light inside the resonator.

In one implementation, the MOS-capacitor structure has dimensions that provide a cutoff mode to capture light of a target wavelength. For example, a cutoff mode to capture light at 1500 nm may be provided by sizing the semiconductor block to have a width (W1) of approximately 50 nm and a height (H1) of approximately 1000 nm.

In general, a total phase shift provided by the metasurface 500 is given by equation (2) below:

$$\text{Total Phase shift} = \frac{2\pi h}{\lambda}\left(\int \Delta n \times E \times \frac{E^*}{\int E \times E^*}\right) \quad (2)$$

where E is the optical field in at the oxide/semiconductor interface, E* is the complex conjugate of the optical field, $\Delta n$ is the change of index within the phase shifter, h is the height of the phase shifter, and $\lambda$ is the target wavelength of operation. Thus, in this case, the total phase shift depends on the strength of the carrier accumulation effect at the semiconductor/oxide interface and the optical field at this interface. Since the optical field increases proportion decreases in waveguide width (e.g., a narrow width provides a stronger optical field), this implementation provides a higher optical field per unit area than the implementations of FIG. 1-4. In one implementation consistent with the example dimensions provided above (e.g., a target wavelength of 1550 nm), a total phase shift attained is greater than 60 degrees.

Likewise, the metasurface 500 is tuned to provide a strong carrier accumulation effect. In one implementation, the oxide layer 504 is hafnium oxide (HfO$_2$), which is a readily available and CMOS-compatible material. In order to increase attainable carrier cumulation effect of HfO$_2$, the thickness of this layer is engineered to be very thin compared to other MOS-capacitor structure solutions. Notably, the attainable index change increases with decreasing thickness of this layer. However, high index changes make take longer to achieve. In one implementation, a desirable tradeoff between high index change and speed is achieved when the HfO$_2$ has a thickness substantially between about 1 nm and 5 nm. As used herein, "substantially" and "about" each refer to a range that is +/−5% of provided values.

In one implementation where the oxide layer is HfO$_2$, the semiconductor is negatively-doped silicon (n-Si), and the metal is gold, the above-described design provides an approximate change in the index Δη of approximately 0.1-1.0 with a voltage bias of less than about 6 Volts. Losses observed may be on the order of 3-5 dB/μm, with the higher end of this range being observed at higher tuning levels. Higher losses may be observed at higher tuning levels.

Figure 6:
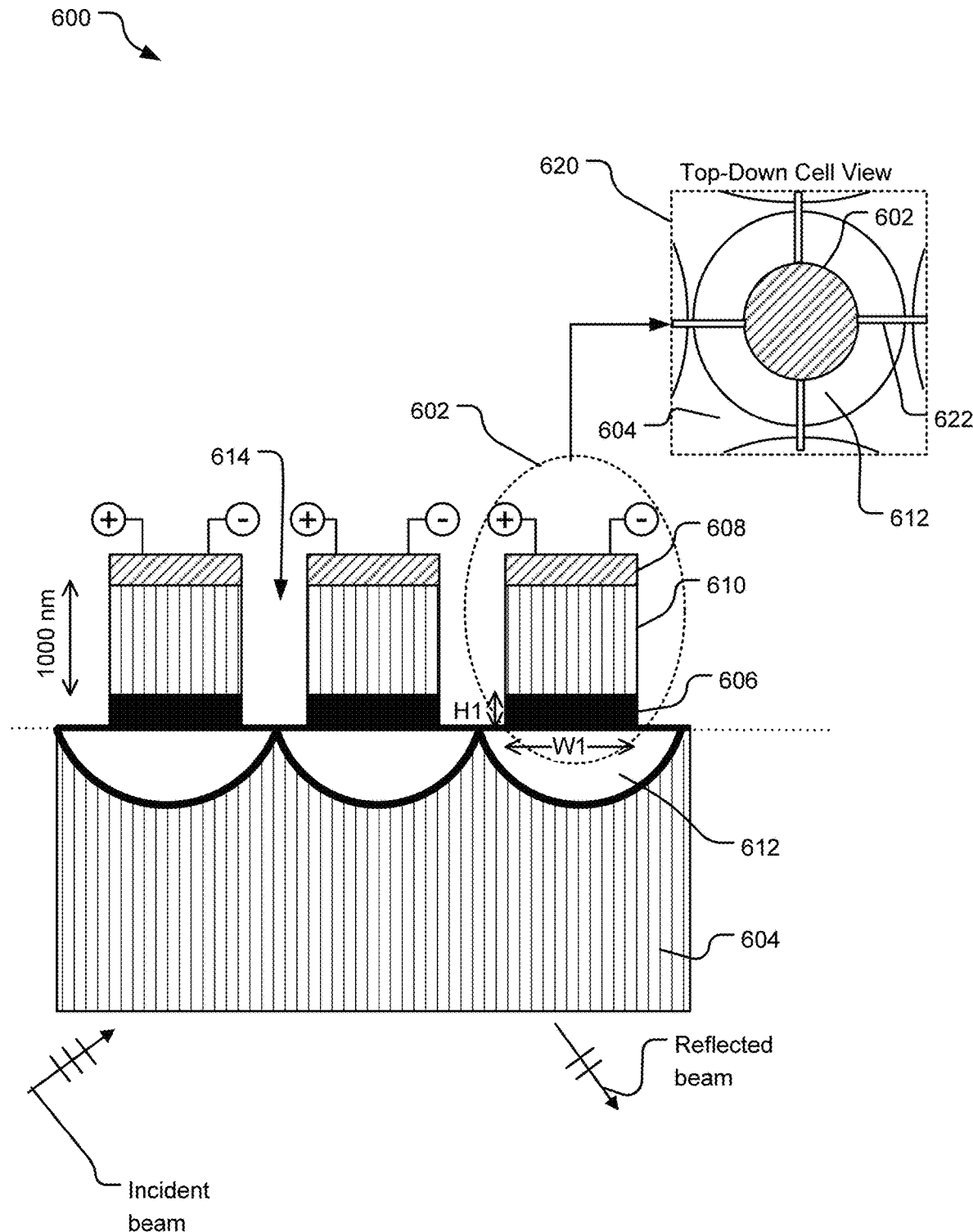
FIG. 6 illustrates an example metasurface that leverages a thermo-optical effect to selectively modulate an index of refraction within each of a number of cells in a metasurface.

FIG. 6 illustrates an example metasurface 600 that leverages the thermo-optical effect to selectively modulate an index of refraction within each of a number of cells (e.g., a cell 602). Like the other metasurfaces disclosed herein, the metasurface 600 includes a number of periodically-repeated cells arranged on a low-index dielectric substrate 604 (e.g., a silicon substrate such as). Each of the cells includes a high-index dielectric block 606 which, in one implementation, is a silicon disk that is undoped.

The high-index dielectric block 606 of each cell is selectively heated by an electrode 608 separated from the high-index dielectric block 606 by a spacer material 610. The spacer material 610 is included to mitigate thermal losses and is therefore made of a material with high thermal conductivity but that provides low optical losses, such as diamond-like carbon or silicon dioxide. For example, the spacer material 610 may include diamond-like carbon or silicon dioxide that is approximately 1 micron in height (H1).

In one implementation, the high index dielectric block 606 is a layer of silicon that is made as compact as possible to confine electromagnetic energy to a small volume while still being enough to ensure capture of light of a target wavelength. In general, a width (W1) of the high index dielectric block 606 may be bounded at the upper end by λ/2, where λ is the target wavelength (e.g., W1<λ/2). However, a width that is too small hinders tuning capability. In one implementation the high-index dielectric block 606 is tuned for a target wavelength of 1550 nm and has a width of 600-700 nm. A height (H1) of the high-index dielectric block 606 may be tuned to provide resonance at a desired wavelength. In the above implementation where resonance tuning is provided for a target wavelength of 1550 nm, the height (H1) is 350 nm.

Although the electrode 608 may include a variety of suitable materials, materials with highest conductivity provide more efficient heat transfer. Additionally, the electrode 608 may comprise a sufficiently reflective material to ensure no light is lost through the electrode 608. In one implementation, the electrode 608 is a tungsten, the spacer material 610 is diamond-like carbon, and the high-index dielectric block 606 is a silicon disk.

Each individual cell 602 is separated from the low-index dielectric substrate 604 by an insulating undercut area 612. The insulating undercut area is, for example, a cavity filled with air. In one implementation, the cavity is formed via a selective etch that uses hydrofluoric acid (HF) to locally dissolve the oxide layer beneath each high-dielectric block 606. HF has a unique property that it dissolves silicon dioxide without dissolving or etching silicon. Therefore, a silicon dioxide layer (not shown) may be dissolved in a region between the low-index dielectric substrate 604 (e.g., a silicon substrate) and the high index dielectric block 606 (e.g., a silicon disk). The etch rate is time dependent and thus can be controlled via property timing.

In one implementation, the insulating undercut area 612 has a diameter greater than a corresponding diameter (W1) of the high-index dielectric block 606. In this case, the cell 602 may be suspended above the insulating undercut area 612 via one or more mechanical tethers, such as in the manner shown within top-down cell view 620. Specifically, the top-down cell view 620 illustrates exemplary positions for mechanism tethers 622 that prevent each cell from collapsing into the underlying insulating undercut area 612. Although any number of tethers may be used, the top-down cell view 620 illustrates four separate mechanical tether 622 that each extend across a region of the insulating undercut area 612 between a wall of the low-index dielectric substrate 604 and the cell 602, providing both tension and support that allows the cell 602 to rest in a position vertically aligned with a center of the underlying cavity.

In one implementation, the mechanical tethers 622 are attached to the cells of the metasurface 600 prior to the formation of the insulating undercut areas 612. When the metasurface 600 is dipped into a selective etch solution (e.g., HF), material in each of the insulating undercut areas 612 is dissolved, leaving behind the structure illustrated in FIG. 6.

The insulating undercut area 612 insulates the bottom side of the corresponding high-index dielectric block 606 to reduce heat loss that may otherwise occur at the boundary with between the high-index dielectric block 606 and the low-index dielectric substrate 604. In one implementation, the insulating undercut area 612 has a diameter that is equal to or greater than a corresponding diameter of a the high-index dielectric block 606 (e.g., diameter W1). Inclusion of the undercut structure to mitigate thermal losses improves the power efficiency of the metasurface 600 by a factor of 10 or more.

Notably, each of the cells on the metasurface 600 are separated from one another by air (e.g., an air gap 614). Thus, each cell is insulated on side surfaces from the adjacent cells and on the bottom surface via the thermal undercut region 612. This implementation leverages the thermo-optical effect to change the refractive index of the high-index dielectric block 604 by applying heat. The magnitude of the maximum attainable index change goes on the order of Δn~1.8×10$^{-4}$ (1/K) (ΔT) where K represents the unit Kelvins and ΔT represents the number of degrees by which the temperature of the high-index dielectric block is changed. For example, a temperature change of 1 Kelvin corresponds to an index change of ~1.8×10$^{-4}$. Per this relation, the above-disclosed design may utilize thermal tuning to realize an index change of ~10$^{-2}$ or 10$^{-3}$ for a temperature increase of approximately 100 Kelvin.

As shown in FIG. 6, the metasurface 600 operates in reflective mode, both receiving light and re-emitting phase-shifted light through a same surface of the low-index dielectric substrate 604. Each of the cells of the metasurface 600 may have a quality factor (Q-factor) that is higher than the embodiments disclosed with respect to FIG. 1-5 due to efficient heat transfer and low thermal losses. However, as the number of cells on the metasurface 600 increases, so too does the power consumption. Since using heat to change the index of cells is less power efficient than other approaches disclosed herein, the metasurface 600 may be ideally implemented in smaller arrays, such as of the size 100×100 cells or less.

The index-modulation operations described herein with respect to the metasurfaces of FIG. 1-6 may be implemented as processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A metasurface comprising:
a number of cells arranged on a substrate, each of the cells including:
a high-index dielectric block including an interface between a positively-doped material and a negatively-doped material; and
electrodes configured to provide a voltage differential across the high-index dielectric block to flow current along a current path that passes through the high-index dielectric block, at least a portion of the current path being substantially parallel to a plane defined by the metasurface; and
a controller that dynamically alters a voltage differential supplied to the electrodes of each of the cells to alter a refractive index of each of the high-index dielectric blocks in order to controllably steer light exiting the cell.

2. The metasurface of claim 1, wherein each of the cells has dimensions that provide a Mie resonance mode to enhance an electric field component of light of a target wavelength.

3. The metasurface of claim 1, wherein each of the cells is doped to have a positive charge density that increases in a first direction of the cell and a negative charge density that increases in a second opposite direction of the cell.

4. The metasurface of claim 3, wherein the positive charge density and the negative charge density vary in a direction that is generally parallel to the plane defined by the metasurface.

5. The metasurface of claim 1, wherein the high-index dielectric block is a silicon resonator.

6. The metasurface of claim 1, wherein the cell is reverse biased such that the controller applies a positive voltage to a first electrode in contact with a negatively-doped region and a negative voltage to a second electrode that is in contact with a positively-doped region.

7. A method of controlling a metasurface to steer light, the method comprising:
receiving light at each of a number of cells arranged on a substrate, each of the cells including at least:
a high-index dielectric block including an interface between a positively-doped material and a negatively-doped material; and
electrodes configured to supply a voltage differential to the cell to flow current along a current path that passes through the high-index dielectric block, at least a portion of the current path being substantially parallel to a plane defined by the metasurface; and
dynamically altering a voltage differential supplied to the electrodes of each of the cells to alter a refractive index of each of the high-index dielectric blocks in order to controllably steer light exiting the cell.

8. The method of claim 7, wherein each of the cells has dimensions that provide a Mie resonance mode to enhance an electric field component of light of a target wavelength.

9. The method of claim 7, wherein each of the cells is doped to have a positive charge density that increases in a first direction of the cell and a negative charge density that increases in a second opposite direction of the cell.

10. The method of claim 9, wherein the positive charge density and the negative charge density vary in a direction that is generally parallel to the plane defined by the metasurface.

11. The method of claim 9, wherein the high-index dielectric block is a silicon resonator.

12. A system comprising:
at least one cell including a high-index dielectric block including a junction between a positively-doped material and a negatively-doped material;
electrodes arranged on opposite sides of the at least one cell and each being separated from a phase-shifting portion of the high-index dielectric block;
circuitry configured to supply a voltage differential to the electrodes and to dynamically alter the voltage differential to control a refractive index of the high-index dielectric block and thereby controllably steer light exiting the cell.

* * * * *